US009367067B2

(12) United States Patent
Gilmore et al.

(10) Patent No.: US 9,367,067 B2
(45) Date of Patent: Jun. 14, 2016

(54) DIGITAL TETHERING FOR TRACKING WITH AUTONOMOUS AERIAL ROBOT

(71) Applicants: Ashley A Gilmore, Salem, OR (US); David L Dewey, Port Ludlow, WA (US)

(72) Inventors: Ashley A Gilmore, Salem, OR (US); David L Dewey, Port Ludlow, WA (US)

( * ) Notice: Subject to any disclaimer, the term of this patent is extended or adjusted under 35 U.S.C. 154(b) by 34 days.

(21) Appl. No.: 14/214,123

(22) Filed: Mar. 14, 2014

(65) Prior Publication Data

US 2015/0205301 A1    Jul. 23, 2015

Related U.S. Application Data

(60) Provisional application No. 61/800,201, filed on Mar. 15, 2013.

(51) Int. Cl.
| | |
|---|---|
| *G05D 1/08* | (2006.01) |
| *G01S 19/13* | (2010.01) |
| *G05D 1/10* | (2006.01) |
| *G05D 1/12* | (2006.01) |

(52) U.S. Cl.
CPC .............. *G05D 1/0808* (2013.01); *G01S 19/13* (2013.01); *G05D 1/101* (2013.01); *G05D 1/12* (2013.01)

(58) Field of Classification Search
CPC . G05D 1/0212; G05D 1/0094; G05D 1/0808; G05D 1/12
See application file for complete search history.

(56) References Cited

U.S. PATENT DOCUMENTS

| | | | | |
|---|---|---|---|---|
| 8,423,204 | B2* | 4/2013 | Lee et al. | 701/2 |
| 8,718,838 | B2* | 5/2014 | Kokkeby et al. | 701/3 |
| 9,019,376 | B2* | 4/2015 | Lee et al. | 348/144 |
| 9,026,272 | B2* | 5/2015 | Kokkeby et al. | 701/3 |
| 2008/0054158 | A1* | 3/2008 | Ariyur et al. | 250/203.1 |
| 2009/0157233 | A1* | 6/2009 | Kokkeby | G01S 3/7864 701/3 |
| 2010/0042269 | A1* | 2/2010 | Kokkeby et al. | 701/3 |
| 2010/0250022 | A1* | 9/2010 | Hines et al. | 701/2 |
| 2012/0154579 | A1* | 6/2012 | Hampapur et al. | 348/143 |
| 2012/0287274 | A1* | 11/2012 | Bevirt | 348/144 |
| 2012/0307042 | A1* | 12/2012 | Lee et al. | 348/114 |
| 2013/0176423 | A1* | 7/2013 | Rischmuller et al. | 348/114 |

OTHER PUBLICATIONS

B. Yun, K. Peng and B. Chen, "Enhancement of GPS Signals for Automatic Control of a UAV Helicopter System," In Proc. 2007 IEEE International Conference on Control and Automation, China, Jun. 2007, pp. 1185-1189.*

* cited by examiner

*Primary Examiner* — Thomas G Black
*Assistant Examiner* — Peter D Nolan
(74) *Attorney, Agent, or Firm* — Vincent Anderson

(57) ABSTRACT

An aerial device automatically maintains a relative position with respect to a target. The aerial device can set a relative multi-dimensional position with respect to the target. The target can have an indicator (e.g., a visual marker for image capture tracking, or a radio indicator for tracking via signaling) that the aerial device reads. The aerial device can automatically adjust its flight path in response to movement of the target as indicated by the indicator. Thus, the aerial device can maintain a digital tether, moving with the target to maintain substantially the same relative position with respect to the target, tracking the target in multiple dimensions.

20 Claims, 9 Drawing Sheets

```
                    BEACON PSEUDOCODE - TRACKING 700

702    loop {
704        read GPS data;
706        if (new GPS data) {
708            update beacon_gps_location;
710            desired_robot_position = beacon_gps_location + 3D_offsets;
712            send_radio_command(keep camera pointed to: beacon_gps_location);
714            send_radio_command(move to: desired_robot_position);
716        }
718    }
```

FIG. 7

```
                    ROBOT PSEUDOCODE - TRACKING 800

802    loop {
804        read GPS data;
806        if (new GPS data) {
808            update robot_gps_location;
810        }
812        read radio data;
814        if (radio command keep camera pointed to) {
816            camera_point_target = received position;
818        }
820        if (radio command move to) {
822            nav_target_location = received position;
824        }
826        point camera to: camera_point_target;
828        update nav PID loops;
830    }
```

FIG. 8

```
BEACON PSEUDOCODE - SETTING OFFSETS 900

902   loop while (in fixed hover mode) {
904       read GPS data;
906       if (new GPS data) {
908           update beacon_gps_location;
910       }
912       if (angle, height, or distance controls adjusted) {
914           desired_robot_position += adjustment;
916           send_radio_command(hover at: desired_robot_position);
918       }
920       read radio data;
922       if (receive_radio_telemetry: robot_position) {
924           3D_offsets = robot_position - beacon_gps_location;
926       }
928   }
930   save offsets;
932   enter following mode;
```

FIG. 9

```
ROBOT PSEUDOCODE - SETTING OFFSETS 1000

1002  loop {
1004      read GPS data;
1006      if (new GPS data) {
1008          update robot_gps_location;
1010      }
1012      receive radio data;
1014      if (radio command hover at) {
1016          hover_target_position = received position;
1018      }
1020      update hover PID loops;
1022      send radio telemetry: robot_gps_position;
1024  }
```

FIG. 10

DIGITAL TETHERING FOR TRACKING WITH AUTONOMOUS AERIAL ROBOT

RELATED APPLICATIONS

This application is a nonprovisional based on and claims the benefit of priority of U.S. Provisional Application No. 61/800,201, filed Mar. 15, 2013. The provisional application is hereby incorporated by reference.

FIELD

Embodiments described are related generally to unmanned aircraft, and embodiments described are more particularly related to a tracking aerial device.

COPYRIGHT NOTICE/PERMISSION

Portions of the disclosure of this patent document can contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright © 2014, Gilmore Labs, LLC. All Rights Reserved.

BACKGROUND

Aircraft are currently used to film a variety of sporting events. However, the cost of using aircraft is very high. Additionally, there are practical limitations on how the types and angles of camera shoot that can be accomplished with traditional aircraft filming. There are currently RF (radio frequency) aircraft available, but the limitations on flight control and signal delays makes the traditional use of such aircraft either difficult or unfit for filming certain sporting events. Traditional use of such aircraft required multiple individuals (e.g., a driver and a camera controller) to coordinate to simultaneously fly the aircraft and capture images.

BRIEF DESCRIPTION OF THE DRAWINGS

The following description includes discussion of figures having illustrations given by way of example of implementations of embodiments described. The drawings should be understood by way of example, and not by way of limitation. As used herein, references to one or more "embodiments" are to be understood as describing a particular feature, structure, or characteristic included in at least one implementation. Thus, phrases such as "in one embodiment" or "in an alternate embodiment" appearing herein describe various embodiments and implementations, and do not necessarily all refer to the same embodiment. However, they are also not necessarily mutually exclusive.

FIG. 7 is a representation of an embodiment of pseudocode for a beacon to provide tracking information to an aerial robot.

FIG. 8 is a representation of an embodiment of pseudocode for aerial robot to track a target via a beacon.

FIG. 9 is a representation of an embodiment of pseudocode for a beacon to establish a digital tether with an aerial robot.

FIG. 10 is a representation of an embodiment of pseudocode for aerial robot to establish a digital tether with a beacon.

Figure 1:
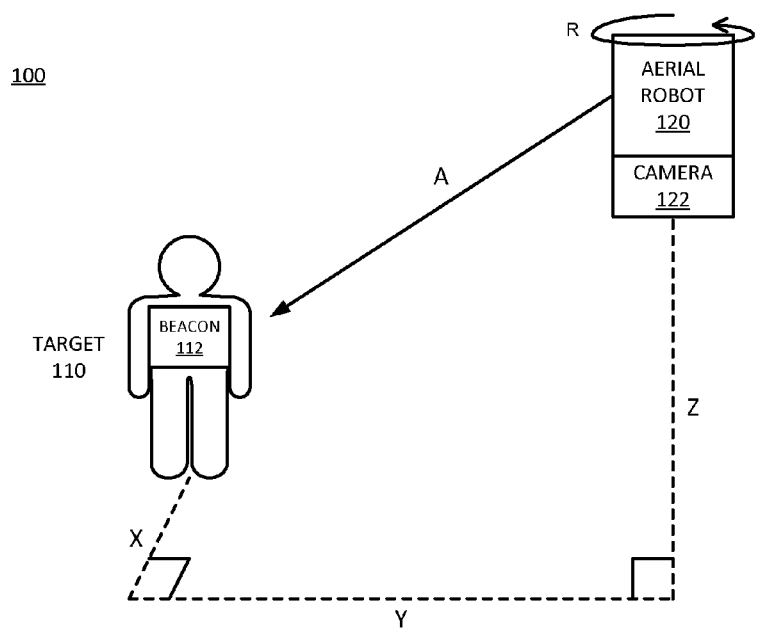
FIG. 1 is a block diagram of an embodiment of an aerial robot that maintains a position A with respect to a target.

Descriptions of certain details and embodiments follow, including a description of the figures, which can depict some or all of the embodiments described below, as well as discussing other potential embodiments or implementations of the inventive concepts presented herein.

DETAILED DESCRIPTION

As described herein, an aerial device automatically maintains a relative position with respect to a target. Maintaining the relative position with respect to a target can be referred to as a digital tether. The electronic platform of the aerial device can cause the device to move with the target to maintain substantially the same relative position with respect to the target. The position can be a three dimensional (3D) position and/or an offset with respect to angle to the target. Tracking the target can include tracking in the three dimensions of space as well as other dimensions (e.g., velocity, angle). The aerial device first sets a relative position with respect to the target to determine what relative position to maintain. The position can include two dimensional distance component (x and y distance components) as well as an altitude component (z distance component). In one embodiment, the aerial device maintains an x and y position as the digital tether, but not necessarily an altitude component. In one embodiment, the aerial device also has an angle component, which indicates an angle of observance. The angle can be relative to a direction of movement, relative to a compass heading, and/or relative to an indicator or identifier of the target. In one embodiment, the angle is part of the digital tether. The target can have an indicator (e.g., a visual marker for image capture tracking, or a radio indicator for tracking via signaling) that the aerial device monitors. The aerial device can automatically adjust its flight path in response to movement of the target as indicated by the indicator.

It will be understood that the device can either be referred to as an "aerial device" or an "aerial robot." The expression "aerial robot" merely points out the fact that at least some of the operations occur automatically, without specific user intervention during the course of operation of the device. The autonomy of the operations typically results from configuring and/or programming the device to identify and react to certain signals and/or sensor inputs. Thus, a user does not necessarily "fly" the aerial device once it is triggered to track a target. Instead, the configuration/programming of the device allows it to automatically track the target. It will be understood that the aerial device includes an aerial platform, which is a hardware platform including the controlling mechanisms and processing devices that allow automatic operation of the device (e.g., processor, sensors). The hardware platform interfaces with and/or is part of the hardware on the aerial device that enables flight and motor control devices (e.g., motors, controllers for the motors). The hardware platform could be a module that is connected to an aerial device. For purposes of example, the autonomous aerial device is typically referred to herein as an aerial robot.

In one embodiment, the aerial device is an image capture platform that tracks a moving target. For example, the aerial device can include photography and/or video equipment to monitor the target. The image capture equipment can include still photograph capture devices, lenses, video capture devices, or other image capture equipment. In one embodiment, the aerial device also or alternatively includes audio monitoring equipment, such as a microphone. In one embodiment, the aerial device can include other data capture sensors, such as infrared sensors, or other sensors.

In one embodiment, the position of the aerial device from the target can be set to a certain angle, distance, and height from the target, or latitude, longitude, and altitude offset with respect to the target. In one embodiment, the aerial device tracks the position of the target via a "beacon" attached to the target. In one embodiment, the beacon contains a GPS (global positioning system) module, microprocessor, radio or other communications link, and optional accelerometers, gyroscopes, magnetometer, barometer, or other sensors to complement the GPS position data. In one embodiment, the aerial device obtains initial position information from a GPS device, and tracks the target by radio signal strength or propagation delay for a target that generates a radio frequency beacon signal. In one embodiment, the aerial device obtains initial position information via an ultrasound beacon signal, which can be used for propagation delay and/or signal strength distance measurement. In one embodiment, the aerial device tracks the target at least in part via light or ultrasound sensing. In one embodiment, the aerial robot maintains altitude above the target at least in part by measuring barometric pressure difference. In one embodiment, the aerial device detects direction to the target by using one or more directional antennas (or sensors) to receive a signal from the target.

In one embodiment, the aerial device includes optical flow processing or other image processing components to perform image recognition to track the target. The target can be or include an identifying shape and/or color that can be identified by the image processing technology used on the aerial device. Thus, the aerial device can determine the location of the moving object (the target) in a captured video stream, and use feedback to move the aerial device to maintain the target with a consistent size and position in the video stream. In one embodiment, such video processing techniques can be used to complement data sent to the aerial device from the target. In one embodiment, such video processing techniques can be used to eliminate the need for the target to send beacon data to the aerial device.

It will be understood that an autonomously tracking aerial device or aerial robot can be at risk for flyaways and/or crashes. The aerial device can include one or more features to reduce the risk of flyaways and crashes. It will be understood that completely eliminating the risk may not be possible in all cases. However, certain features can significantly reduce injury and/or damage due to flight errors by an autonomous device.

In one embodiment, the aerial device is governed by a "panic" button or override switch controlled by a user or administrator of the device. The aerial platform hardware can include an interrupt and logic to override any other flight operations. For example, the override can cause the aerial device to stop flying and enter a static hover when activated. In one embodiment, the static hover is governed by GPS positioning information. In one embodiment, the aerial device maintains a static hover based on inertial measurement sensors on the aerial platform. For example, the flight management of the device can attempt to keep the aerial device in a position that reduces all inertial measurements as close to zero as possible.

In one embodiment, the aerial platform supports the use of a kill switch to completely stop all motors on the aerial platform. A kill switch can be initiated via some type of signaling provided to the aerial device by a user or administrator. The use of a kill switch in the case of an imminent crash or flight management unit (FMU) malfunction would inevitably cause the device to crash, but can reduce the damage associated with the crash. For example, stopping all motor function can reduce propeller speed prior to a crash, which is expected to reduce the danger associated with high velocity propeller spinning. The kill switch crashing can actually reduce propeller and motor damage in the event of a crash.

In one embodiment, the aerial device is programmed to automatically enter a static hover and/or to automatically land under any of a variety of error conditions. For example, the aerial device can enter a static hover if it loses a beacon signal from the target and/or cannot identify the target from image processing. Thus, in cases of interrupted radio communication, too great a distance between the target and the aerial device, the aerial device at an unsafe proximity to the target (as indicated by sensor(s) and/or configuration), robot battery low, or other conditions that make continuing to fly unsafe and/or inadvisable. In another example, the aerial device can perform an automatic landing in cases of losing a GPS signal, not being able to obtain an accurate GPS fix (e.g., because of identifying too few GPS satellite signals), or identifying that the position module's accuracy is below a threshold. It will be understood that the conditions could also result in the aerial device entering a static hover. It will also be understood that any of the other conditions identified above as causing a static hover could also, or alternatively, cause the aerial device to automatically land. In one embodiment, upon detection of an error, the aerial device can first attempt to enter a static hover, and if unsuccessful in maintaining a static hover, automatically land.

In one embodiment, any error condition can cause the aerial device to generate an alert. For example, if the aerial platform determines that there is an error on the platform, it can initiate a sound, vibration, flashing light, an error transmission that shows up on a display device, or other alert. Such an alert can be sent from the aerial device to a beacon device or control device for the aerial device. Thus, in cases where a user elects to have the aerial device follow from behind or otherwise out of sight, the aerial device can indicate an error to the user, and for example, indicate that it has engaged in a static hover or automatic landing. It will be understood that if the error condition is a loss of radio transmission, such a signal may be unable to get through. However, repeatedly sending such a signal anyway can increase the possibility that at least one attempt to indicate the error will be detectable to the user. Loss of radio transmission could also be an error condition in itself, which can be displayed or otherwise indicated on a user's handheld or body mounted device.

In one embodiment, the aerial device tracks a target device based on radio signal exchanges with the target. Such radio signal exchanges can include a checksum to prevent corrupted radio link data from causing incorrect commands. Thus, the system can be configured to accept only data with a valid checksum and/or commands with a valid checksum by the receiving device.

Most examples provided herein refer to the offset or the digital tether in terms of the three dimensions of distance (two horizontal dimensions and a vertical dimension). However, it will be understood that the offsets or digital tether can be understood as multidimensional. In addition to the three distance dimensions, the aerial robot can track velocity and/or acceleration and/or angle with respect to the target. Any one of these, or all of them, could be considered additional dimensions. Thus the aerial robot can track in multiple dimensions, three distance dimensions as well as other dimensions. For example, in one embodiment, the aerial robot can be programmed for a preset path, tracking a specific flight path with respect to a race course or event course. Thus, the three dimensions of distance could be set for each part of the flight path in certain implementations. The aerial robot can then dynamically track or respond to controls for velocity and/or acceleration along the flight path. Thus, the aerial robot can track a target in multiple dimensions.

FIG. 1 is a block diagram of an embodiment of an aerial device or robot that maintains a position A with respect to a target. System 100 includes aerial robot 120, which has a digital tether with target 110. Target 110 is illustrated as a person, but could be another device or vehicle, an animal, or other object to track. Vector A or position A represents an offset between aerial robot 120 and target 110. As illustrated, vector A can include X, Y, and/or Z components, representing two horizontal axes and a vertical axis. The distance along any of the axes can be any distance so long as vector A is within range of the monitoring and tracking capabilities of aerial robot 120. Thus, vector A should be within range of a radio signal if a radio beacon is used, or within range of optical processing if optical processing is used. In one embodiment, vector A is bounded within programming, based on tracking technology used.

Aerial robot 120 can be set at an offset of a certain distance in front or behind target 110, to one side or the other, and at a certain altitude with respect to the target. In one embodiment aerial robot 120 is set directly inline with target 110 along one of the axes. It will be understood that by setting the robot inline with the target, one or more of the other axes will be eliminated. In one embodiment, aerial robot 120 can also set an angular rotation or angle R with respect to target 110. Angle R refers to how aerial robot 120 is "pointed" at target.

In one embodiment, target 110 is a user of aerial robot 120. In one embodiment, the user has a controller that allows certain interaction with the robot. Thus, the user can set vector A, and/or adjust the position offsets of the digital tethering. While the expression digital tethering is used, "shadowing" is another expression that can be used to refer to the tracking of aerial robot 120 at a relatively constant vector A. It will be understood that in practice vector A may only be fixed with respect to expected tolerances. Thus, aerial robot 120 can maintain substantially the same relative position with respect to target 110, while still varying slightly. The tolerances can include positional tolerances, as well as delay/timing tolerances. For example, initial movements and/or acceleration by target 110 can cause a delay in the tracking of aerial robot 120.

Over time, on average, aerial robot 120 is expected to track target 110 at substantially the same distance or offset(s).

In one embodiment, aerial robot 110 includes image capture hardware, such as a video recording device or camera (either still image camera, video camera, or both), as represented by camera 122. Camera 122 can monitor target 110, and can move relative to target 110 at least partially independently of aerial robot 120. Camera 122 represents both the image capture hardware and motion control hardware of camera 122. In one embodiment, camera 122 is fixed on aerial robot 120, and will thus monitor target 110 based on vector A of aerial robot to target 110, and angular position R of the robot relative to the target. Camera 122 can be fixed at a vertical angle down from horizontal (planar with respect to the ground), to enable the camera to monitor the target. In one embodiment, the vertical angle of camera 122 with respect to aerial robot 120 is adjustable. In one embodiment, the vertical angle and the rotational angle of camera 122 is adjustable. Thus, at least one of pitch or yaw of camera 122 can be adjusted with respect to the target, at least partially independently of adjusting a position of the aerial robot.

In one embodiment, target 110 includes beacon 112. Beacon 112 represents a device or mechanism at the target that can send commands and/or exchange data with aerial robot 120. It will be understood that a "controller" that enables manual control of aerial robot 120 and/or the sending of commands to the aerial robot can exist separately from in addition to or in place of having such controls at beacon 112. Thus, in one embodiment, beacon 112 is a relatively simple signal generating device, while in another embodiment, beacon 112 is part of or connected to a controller at target 110. In one embodiment, aerial robot 120 sends data captured by camera 122 to beacon 112 or a controller.

The initial positioning of aerial robot 120 with respect to target 110 can set the digital tether for the aerial robot. As mentioned above, vector A represents the digital tether, and can include offsets in X, Y, and/or Z. Thus, system 100 can set a relative three dimensional position of aerial robot 120 with respect to target 110. The user can set the one or more offsets by adjusting height, angle, and distance controls of aerial robot 120, by flying the robot manually to the desired position, and/or by moving the target to the desired location relative to the aerial robot. In one embodiment, the user can set a button or other control to command the system to record the particular offsets. When offsets are set, aerial robot 120 can record the three axis position offsets.

In one embodiment, beacon 112 records the offsets. In one embodiment, beacon 112 sends commands and flight information for aerial robot 120 based on movement of target 110. Thus, beacon 112 can include processing hardware that generates position data for aerial robot 120. In such an implementation, beacon 112 can store the offsets for vector A, and factor the offsets into calculations of position data to send to aerial robot 120. In one embodiment, the beacon records offsets for aerial robot 120 and adds the offsets to its own position information, which it then sends to aerial robot 120 over a radio link. In one embodiment, aerial robot 120 records the offsets and adds them to position information sent by beacon 112.

In one embodiment, angle R can be relative to compass direction from target 110. For example, aerial robot 120 can be set at an offset of 45 degrees (northeast). Whichever direction target 110 moves, aerial robot 120 can try to maintain the set distance A away from the target, and maintain an angle of 45 degrees from the target. It will be understood that the offset angle can also be subject to transformation depending on the target's velocity vector. For example, if aerial robot 120 is set at an offset of 45 degrees and target 110 is heading 315 degrees (northwest), the robot will be to the target's left. If target 110 gradually turns west while in motion until the direction of travel becomes due west (270 degrees), aerial robot 120 can correspondingly gradually transform its offset angle R by the same amount, from 45 degrees to 0 degrees. Thus, the robot will still be at the left-hand side of the target.

In one embodiment, the target's course change can be computed from the change in the course given by a GPS module, or simply by comparing successive GPS coordinates. Whether position information is calculated by a controller at target 110 and sent to aerial robot 120 via beacon 112, or whether aerial robot 120 calculates position information, the controller used can apply a smoothing filter to smooth out any sudden course changes. In one embodiment, target 110 includes a magnetometer and/or one or more gyroscopes or other sensors (e.g., in beacon 112). Thus, the direction target 110 is pointed can be determined by the sensors, which can eliminate the requirement that target 110 be in motion to effect changes to offset angle R. Thus, in one embodiment, offset angle R is based on the direction target 110 "faces" instead of successive location information (e.g., successive GPS coordinates).

In one embodiment, aerial robot 120 monitors a sporting event or other activity with camera 122. In such a situation, target 110 would be a participant of the event. If the sport or activity involves many or very sudden direction changes for target 110, in one embodiment, system 100 (either a controller at target 110 and/or at aerial robot 120) can suspend angle transformation. Thus, when measured course changes are too rapid to avoid the need for high speed maneuvering and/or will cause choppiness in the image capture, the system can either temporarily or permanently eliminate changing R. Thus, the angle transformation can automatically be restricted if there are more than a threshold of changes within a time period. The threshold of changes can be a threshold number of changes, or a minimum threshold of angle changes (e.g., do not track angle if the angle change does not reach a certain angle) within a given time period. Alternatively, the offset angle transformation could be turned off manually as the need arises.

Figure 2:
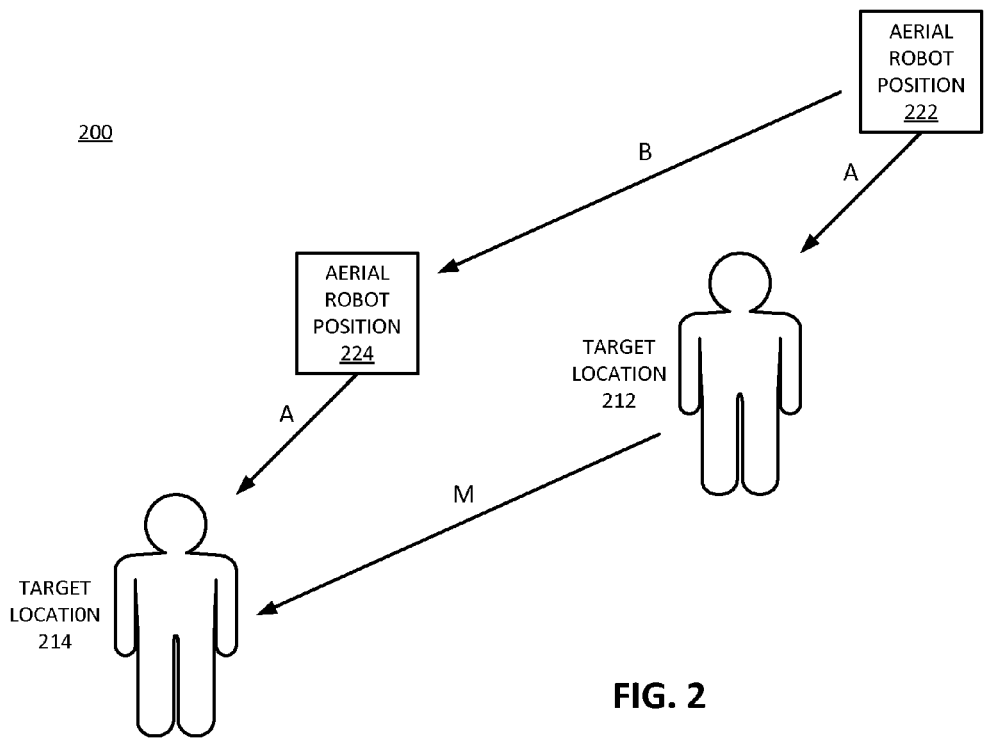
FIG. 2 is a block diagram of an embodiment of an aerial robot that maintains a position A with respect to a target while the target is in motion.

FIG. 2 is a block diagram of an embodiment of an aerial robot that maintains a position A with respect to a target while the target is in motion. While motion of the target and the aerial robot were addressed with respect to system 100 of FIG. 1, system 200 of FIG. 2 illustrates more detail with respect to one example embodiment of motion tracking. More specifically, assume that the target starts at target location 212 and moves to target location 214 via target movement M. It will be understood that movement M is not necessarily straight path or a direct route to location 214, but can include lateral and/or vertical (altitude) changes.

Aerial robot begins at position 222 with an offset or vector A difference to the target at location 212 (which may or may not be the same vector A as shown in FIG. 1). Offset A represents a three dimensional offset of position 222 from location 112. It will be understood that the offset value of one of the dimensions could be zero. In one embodiment, the aerial robot moves from position 222 to position 224 in response to movement M. Flight path B represents the flight path of the aerial robot to move from position 222 to position 224. In one embodiment, the aerial robot computes and executes flight path B to maintain or approximately maintain offset A with respect to the target. The movement of the target can be in any direction and the aerial robot can track the target. The target can also change direction, as discussed above, and the robot can track the target to maintain the relative position of offset A with movement in any direction, and following changes of direction.

In one embodiment, the aerial robot tracks the target by adjusting its position based on changes to the position or location of the target, adjusted by the same offsets. Thus, in one embodiment, the aerial robot sets position 222 by discovering location 212 and generating offset values to represent offset A. The aerial robot and/or the target can compute the offset values by computing three dimensional position differences between the target and the aerial robot. Once computed, the aerial robot and/or the target can simply add the offset values to position data for the target as it changes locations. In one embodiment, system 200 maintains offset A between the aerial robot and the target by a beacon of the target reading position data from its GPS module, adding X, Y, and Z offsets, and sending commands through a radio link for the aerial robot to fly the calculated position. When tracking and/or positioning mechanisms other than GPS are used, the offset calculations can be obtained from whatever sensor or module in the aerial robot and/or the beacon provides the information.

It will be understood that continual position information transfer may not be feasible in an actual implementation. Rather, there will be a delay or a difference between a time when position information and/or offsets and new position information is computed, and when it can be exchanged and acted upon. For example, in the case of using GPS equipment to track motion, it will be understood that GPS modules have varying sophistication levels. Less expensive GPS modules may include a delay in processing that prevents the system from being a true real-time system. In such a case, a pseudo-real-time system can be considered "real-time" based on the use of the information generated and exchanged in the system.

Certain GPS modules or units (especially lower cost devices) may read or compute location or position data that does not actually reflect the current coordinates of the target or aerial robot, but instead the coordinates from a short time prior (for example 0.5 seconds before). Lag can also be introduced elsewhere in the system, such as processing delay, radio communications delay, and FMU delay. At sufficiently slow speeds of movement M relative to the delay, the delay may be noticeable and considered to be real-time. At higher speeds of movement M, the delay can result in the robot position and/or camera pointing lagging the actual position of the target. In one embodiment, the system can at least partially mitigate the lag or delays in the system by projecting the last known velocity vector and adding it to the last known position to arrive at an estimated current or future position of the beacon. Several of the latest known velocity vectors can be used for a better prediction. Similarly, changes in velocity can be estimated by adding last known acceleration vectors to last known velocity vectors. Depending on the speed of the processing system, the speed of movement M, and the desired resolution, averages and/or instantaneous values of either or both of velocity vectors or acceleration vectors can be used to process a position prediction for the aerial robot. Thus, in one embodiment, flight path B is at least partially dependent on forward prediction of the motion of the target and/or the aerial robot.

In one embodiment, system 200 utilizes inertial measurement to reduce delay in position readings (e.g., position readings from a GPS and/or other sensor). System 200 can also use inertial measurement to fill in gaps in GPS or sensor reception and correct short term GPS or sensor errors. In one embodiment, the target can include an IMU (Inertial Measurement Unit), which allows the target to estimate its absolute position based on relative previous positions. More details of one embodiment of inertial measurement are provided below with respect to FIG. 6. A sufficiently well-equipped aerial robot having sufficient processing power and data storage could also include and employ an IMU.

In one embodiment, the target or an administrator includes a controller. For example, the controller could be included on a beacon device worn or carried by a user. The controller can include a stop button and/or other control to signal the aerial robot to stop and hover in position and/or automatically land. The stopping and/or landing can be triggered if a user is finished with the event to be tracked, or in the case of an error condition such as what is described above.

In system 200, the aerial robot is shown to maintain offset A with respect to the target. In one embodiment, the aerial robot can automatically adjust offset A with respect to the target in flight. In one embodiment, the aerial robot can automatically adjust an angle of offset (e.g., angle R from system 100) in flight with respect to the target. The adjustment of offset can be triggered by a user or administrator, such as by sending one or more commands to the aerial robot. The aerial robot can then adjust its position accordingly. As with position or coordinate determination for the aerial robot discussed above, calculations needed to determine the dynamic offset adjustment could be performed by either the aerial robot or the beacon/target, depending on the configuration of the system. In one embodiment, the aerial robot automatically adjusts its offset relative to the target in cases where the target changes direction more than a threshold number of times within a threshold period of time, and/or when the target changes direction more than a threshold amount within a threshold period of time.

Figure 3:
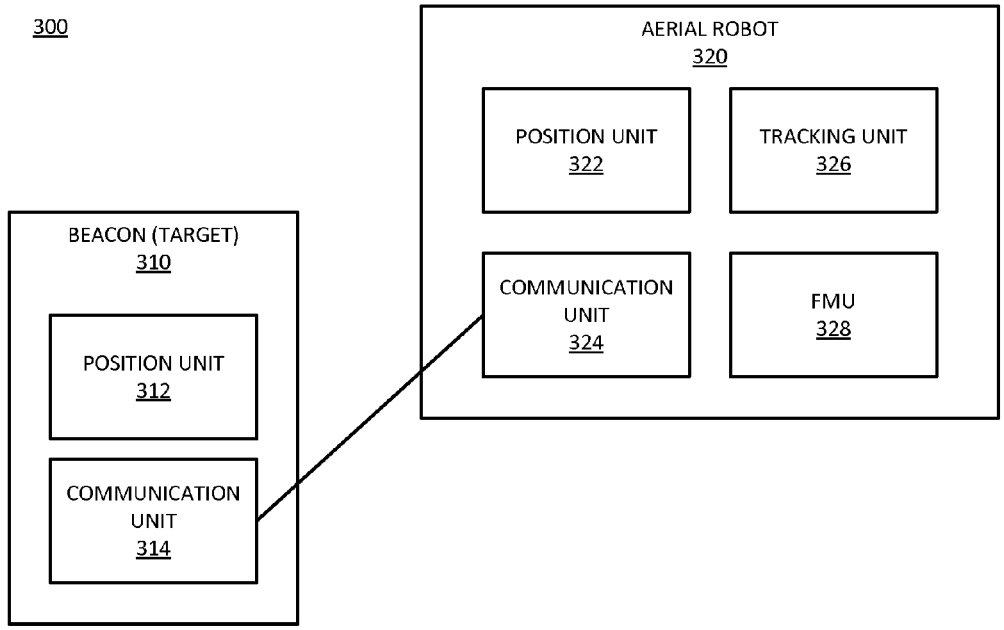
FIG. 3 is a block diagram of an embodiment of a system having an aerial robot that tracks a target via a beacon.

FIG. 3 is a block diagram of an embodiment of a system having an aerial robot that tracks a target via a beacon. System 300 can be one example of system 100 or system 200 in an implementation that uses a beacon at the target. In one embodiment, beacon 310 is co-located with the target, and aerial robot 320 follows the target via tracking the beacon. Beacon 310 can be or include a wearable indicator for a human target. Beacon 310 can be co-located with an object target. In one embodiment, beacon 310 includes position unit 312 to determine the location of the target. In one embodiment, beacon 310 includes communication unit 314 to exchange communication with aerial robot 320. Position unit 312 can include one or more GPS units (e.g., using multiple units for averaging, and/or for forward prediction), and/or other motion and position sensors. Communication unit 314 can include a radio frequency transmitter, an IR transmitter, a laser transmitter, or other device to send a signal to aerial robot 320. In one embodiment, beacon 310 sends its position information as determined by position unit 310 to aerial robot 320 to allow the robot to autonomously change its flight path to track the target.

Aerial robot 320 includes position unit 322 to determine its position and calculate flight path information based on its present location and the change in location of the target. In one embodiment, position unit 322 includes one or more GPS units and/or other sensors. Position unit 322 includes technology to determine a three dimensional location of the aerial robot. In one embodiment, aerial robot 320 includes communication unit 324 to exchange information with beacon 310, such as receiving position information from beacon 310. Communication unit 324 can include a transceiver that allows aerial robot 320 to send and receive messages from beacon 310. The transceiver can be a radio frequency device, IR, laser detector/transmitter device, or other communication device. In one embodiment, communication unit 324 includes multiple antennae (antenna array) to communication with and track beacon 310. In one embodiment, communication unit 324 includes one or more signal sensors to track signal quality and/or direction of arrival of the signal.

Tracking unit 326 enables aerial robot 320 to track the target via beacon 310. Tracking unit 326 can be processor hardware and/or code that executes on a controller or processing device. In one embodiment, tracking unit 326 receives and processes coordinates provided by beacon 310. The coordinates can indicate where aerial robot 320 should fly. The coordinates can be location information from beacon 310, and tracking unit 326 can then perform calculations to determine what position to fly to. In one embodiment, tracking unit 326 works with communication unit 324 to determine the location of beacon 310, such as through signal direction and/or strength measurements, or other measurements of a signal. Tracking unit 326 determines a flight path for aerial robot 320 to take to maintain a relative position with respect to the target (beacon 310). Tracking unit 326 can determine changes in acceleration of the target and/or changes of direction based on information received or sensor data/measurements read.

Aerial robot 320 includes flight management unit (FMU) 328 to control its flight in accordance with a flight path determined tracking unit 326. FMU 328 includes motors, controllers, feedback mechanisms, and other components to cause and adjust flight direction and velocity. FMU 328 can drive the propeller mechanisms of aerial robot 320, such as a multi-propeller system (e.g., aerial robot 320 can be a multicopter, having for example 4, 6, or 8 propellers).

It will be understood that two different GPS modules will give slightly different readings under different conditions (such as weather, current satellite conditions, obstructions, interference, and differences in the GPS modules themselves). In one embodiment, position unit 312 of beacon 310 includes one GPS module and position unit 322 of aerial robot 320 includes another GPS module. The difference in GPS module readings between the target and the aerial robot can cause a difference in reported position between the beacon 310 and aerial robot 320 that will often remain approximately the same over the short period of time that the user is filming. However, the differences change over longer periods of time as conditions change. System 300 can enable synchronization of GPS and/or other location detection modules or unit prior to use. The synchronization can occur on each power-up of the system, and/or prior to each request for aerial robot 320 to track beacon 310. In one embodiment, communication unit 314 and communication unit 324 engage a synchronization routine to identify any offsets in readings between position unit 312 and position unit 322. One possible synchronization procedure can be to place beacon 310 and aerial robot 320 together and issue a command that causes the system (e.g., via software on beacon 310 and/or aerial robot 320) to record the difference in reported position between the two GPS/position detection modules. The system can then account for the difference in position detection during subsequent following activities to allow the aerial robot to properly track and/or point an image capture unit at the target more accurately.

In one embodiment, position unit 312 of beacon 310 includes inertial measurement hardware and software. Thus, the target can estimate its current position more precisely, and indicate its position to aerial robot 320. In one embodiment, position unit 322 of aerial robot 320 also includes inertial measurement hardware and software. Thus, aerial robot 320 can combine inertial measurement with other position detection to estimate its current position more precisely to ensure it flies to the exact position indicated by beacon 310. In one embodiment, aerial robot 320 also computes an error between the actual position and the calculated position, which can drive a PID (proportional-integral-derivative) loop that operates to reduce error as much as possible (within the tolerances of the loop and the hardware of FMU 328). Nested PID loops can be used, which can account for acceleration and velocity control. For example, when the position error is higher, requested velocity toward the target increases, and when the error between requested and actual velocity is higher, acceleration toward the requested velocity increases.

In one embodiment, position unit 312 and/or position unit 322 include additional components to measure altitude. If system 300 uses GPS modules to determine position, the altitude measurement could lack desired precision, depending on the quality of the GPS module used. In one embodiment, position unit 312 and/or position unit 322 includes a barometric measurement module, which can provide a highly accurate air pressure measurement and can determine relative altitude to within tens of centimeters. Air pressure continually changes with weather. In one embodiment, both beacon 310 and the aerial robot 320 can include barometers, which can reduce the effects of changes due to weather. For example, system 300 can apply an error determination between the two barometers to provide an accurate measurement of relative altitude even if absolute measurements vary with weather. In one embodiment, the target will be assumed to be traveling only over land or water. Thus, position unit 322 of aerial robot 320 could include a sonar or laser range finder to determine its altitude. Thus, aerial robot 320 could maintain its altitude or Z component of the digital tether by such a measurement in relation to terrain, and track its X and Y component based on position indications of beacon 310.

In one embodiment, position unit 312 includes sensors or other components to enable beacon 310 to compute velocity information for the target. Beacon 310 via communication unit 314 can indicate a current position as well as velocity information for the target to aerial robot 320. Aerial robot 320 receives the indication via communication unit 324, and tracking unit 326 can determine where the aerial robot should fly based on the position information as well as the velocity information from beacon 310. Tracking unit 326 can then indicate how FMU 328 should direct the flight of aerial robot 320.

The velocity information that beacon 310 sends to aerial robot 320 can include values to indicate an instantaneous speed of the target and/or an instantaneous direction of the target. In one embodiment, the velocity information includes average speed information for the target. In one embodiment, the velocity information includes average direction information for the target.

Figure 4:
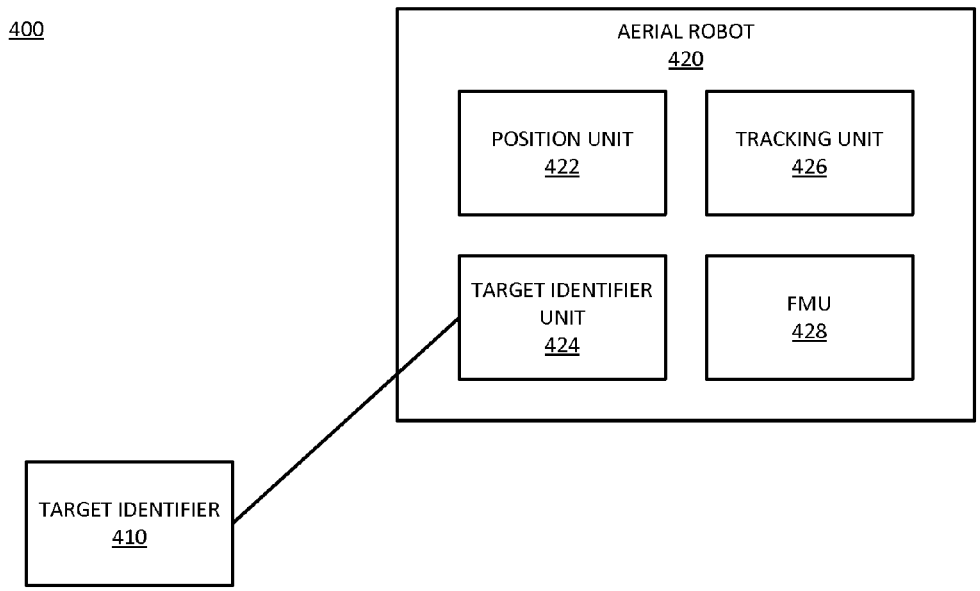
FIG. 4 is a block diagram of an embodiment of a system having an aerial robot that tracks a target via identifying an indicator.

FIG. 4 is a block diagram of an embodiment of a system having an aerial robot that tracks a target via identifying an indicator. In one embodiment, rather than having a transmitting beacon for an aerial robot to track, the target can simply include a target indicator. System 400 300 can be one example of system 100 or system 200 in an implementation that uses a target identifier at the target, other than a transmit beacon. In one embodiment, the target can include a target identifier and a beacon. In one embodiment, the target includes a communication unit to send commands or other information to the aerial robot, but the aerial robot primarily uses target identifier 410 to track the target, rather than beacon information.

Target identifier 410 can be a color, a pattern, or other marker to indicate the target. Alternatively, the target identifier 410 can simply be the target as it moves across frame in captured video. Thus, the target does not necessarily need to be previously tagged with a beacon, but can be acquired in video and then tracked. For example, aerial robot 420 can autonomously pick up the target, or be manually controlled with a signal indicating a target identified by a user based on streamed video.

Aerial robot 420 includes position unit 422 to determine its position and calculate flight path information based on its present location and the change in location of the target. In one embodiment, position unit 422 includes one or more GPS units and/or other sensors. Position unit 422 includes technology to determine a three dimensional location of the aerial robot. Aerial robot 420 can also include tracking unit 426 to track the target via identifier 410. In one embodiment, tracking unit 426 processes tracking information and determines a flight path for aerial robot 420 to take to maintain a relative position with respect to the target (target identifier 410). Tracking unit 426 can determine changes in acceleration of the target and/or changes of direction based on information received or sensor data/measurements read.

Aerial robot 420 includes flight management unit (FMU) 428 to control its flight in accordance with a flight path determined tracking unit 426. FMU 428 includes motors, controllers, feedback mechanisms, and other components to cause and adjust flight direction and velocity. FMU 428 can drive the propeller mechanisms of aerial robot 420, such as a four-propeller system.

In one embodiment, aerial robot 420 includes target identifier unit 424 to track target identifier 410. In one embodiment, target identifier unit 424 is part of tracking unit 426. Target identifier unit 424 can be or include a video tracking system, which can include video, infrared, laser, and/or other systems. Tracking unit 426 computes flight path information based on the movement of the target as indicated by target identifier unit 424.

Figure 5:
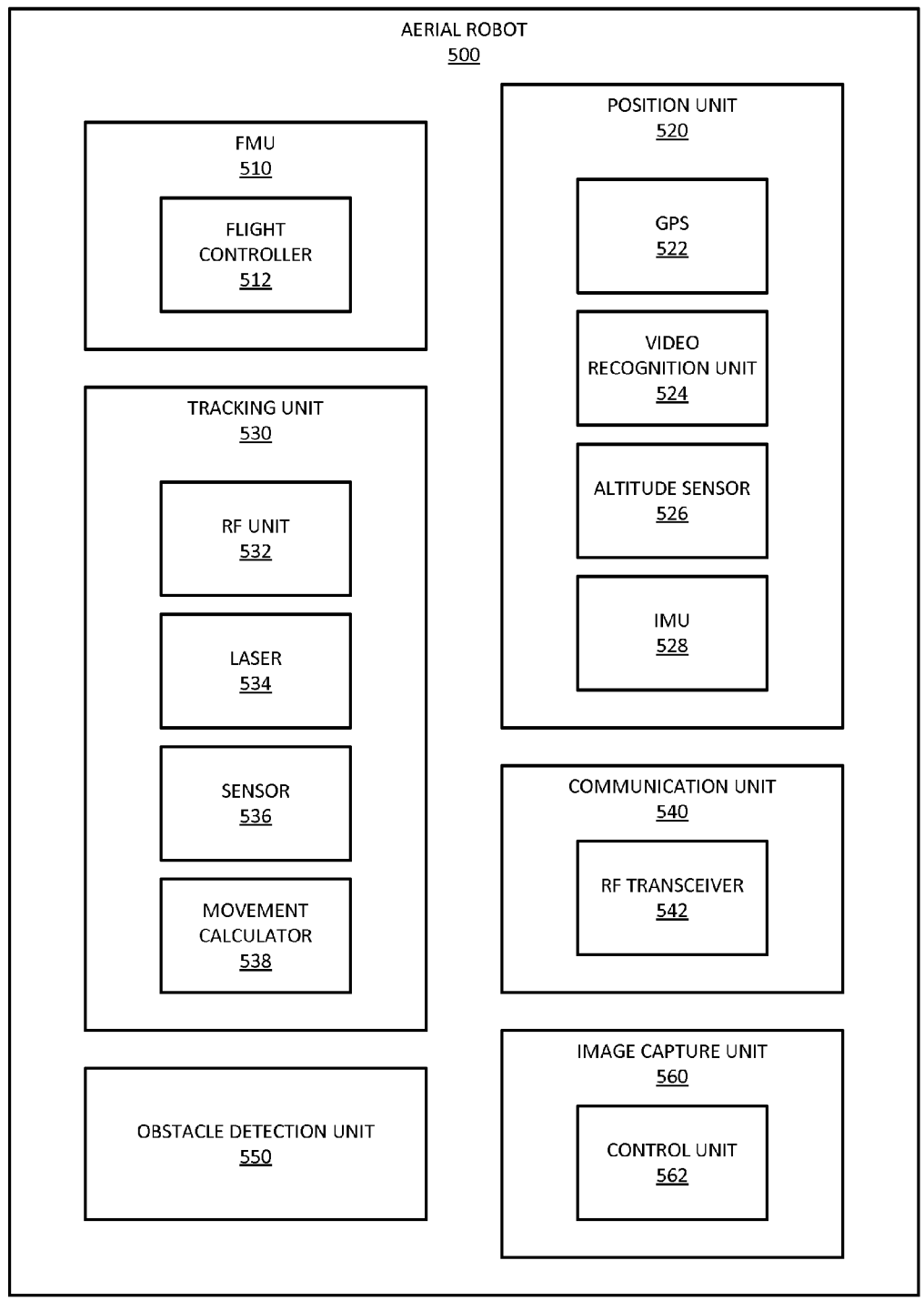
FIG. 5 is a block diagram of an embodiment of an aerial robot including one or more features for detecting its position and tracking a target.

FIG. 5 is a block diagram of an embodiment of an aerial robot including one or more features for detecting its position and tracking a target. Aerial robot 500 can be one example of an aerial robot in accordance with any embodiment described herein. Aerial robot 500 can include one or more of the following features, and does not necessarily include all features indicated in every embodiment. Different embodiments of aerial robot 500 can include different combinations of features. There may be other features that aerial robot 500 includes which are not explicitly described below.

Aerial robot 500 includes FMU 510, which includes one or more flight controllers 512, as are known in the industry. Flight controllers 512 can enable the aerial robot to perform vertical maneuvering, as well as movement in the X and Y axes. Flight controllers 512 can also enable the aerial robot to perform pitch and yaw movements. Thus, FMU 510 controls the flight or flight path of aerial robot 500. FMU 510 can be implemented as a standalone component, or part of an aerial robot platform. FMU 510 includes one or more processor devices that can perform calculations to adjust the flight of aerial robot 500. Flight controller 512 can represent both processing equipment, as well as motors and drivers or other circuitry that interfaces with flight equipment (e.g., propeller unit or propeller systems).

Aerial robot 500 includes position unit 520 to determine the three dimensional position of the aerial robot. Position unit 520 can be implemented as one or more processing devices and sensor devices or circuits. Position unit 520 can include one or more GPS units 522, video recognition units 524, altitude sensors 526, and/or inertial measurement units (IMU) 528. In one embodiment, aerial robot 500 includes multiple GPS units 522 to provide higher accuracy in its position determinations. It will be understood that there are different grades or quality of GPS units. The use of a high accuracy GPS unit can improve the accuracy of position measurement for aerial robot 500, but at a higher cost. Using multiple GPS units 522 can reduce cost and still offer adequate position measurement determinations, but may require more programming or coding to evaluate the differences in GPS readings. The programming or coding can be executed by a processor for position unit 520 and/or by a processor on a general hardware platform for aerial robot 500. In one embodiment, position unit 520 includes or works with an ultrasound component (which could, for example, be part of RF unit 532) to exchange ultrasound signals with the target to determine distance.

Video recognition unit 524 can include video, infrared, laser, and/or other systems. In one embodiment, video recognition unit 524 processes image data in real time to identify the target, such as identifying a visual indicator or identifier of the target. Video recognition unit 524 can identify a specific feature of the target and/or identify the target in contrast to a background image of the captured video signal. Video recognition unit 524 can work in conjunction with and/or be a part of image capture unit 560. Besides what is described here, video recognition unit 524 can operate in accordance with any video capture system known in the art.

In one embodiment, video recognition unit 524 computes an optical flow of video data, and segregates pixels in fairly uniform motion or motion counter to the background (e.g., relative to a system including the target and aerial robot) from pixels not in motion or counter to the motion of the other pixels. Such computations should identify the target within the video data. In one embodiment, video recognition unit 524 may require training to accurately identify the target from other objects that may appear within the video data. From the average position of the target pixels, the target's position relative to the pointing of an image capture device (e.g., image capture unit 560) could be inferred, and thus drift compensation camera offsets could be applied. In one embodiment, video recognition unit 524 tracks the position of an object (such as a colored ball or sticker) or insignia attached to the target or beacon, using common computer vision object recognition techniques. In one embodiment, the target can be marked with a color that is not commonly found or not expected to be found in the background (for example, a skier wearing a red coat on a white snow background). With one or a combination of the above techniques, and fast enough image/video processing, video recognition unit 524 can eliminate the need for a beacon signal for tracking the target.

In one embodiment, altitude sensor 526 can be or include one or more sensors or components of tracking unit 530, such as sonar (RF unit 532), laser altitude guidance (laser 534), barometer (other sensor 536), or other sensor. Altitude sensor 526 can also be or include a GPS unit (such as GPS 522). IMU 528 can utilize or include one or more accelerometers, magnetometers, and/or gyroscopes, such as 3-axis devices. In one embodiment, IMU includes a compass declination lookup table for all locations on Earth, and includes a magnetometer to track orientation over time. Gyroscopic data can be integrated to compute instantaneous orientation data. Orientation and accelerometer data can be integrated to compute velocity, which can be integrated to compute position. Such a resulting position is relative, but can be used to estimate absolute position by integrating over a time period corresponding to a specific lag in GPS data, then adding the relative position to the absolute position from GPS 522 to get an estimate of the absolute position at the current instant.

Tracking unit 530 can include one or more of RF unit 532 to emit and/or receive radio frequency signals (which could include ultrasound signals), one or more lasers 534 or other light frequency signals and/or signal sensors, and/or other type(s) of sensor 536 (e.g., a barometric pressure sensor). Tracking unit 530 includes movement calculator 538 to compute flight path information for FMU 510. Movement calculator 538 can be or include a processor within tracking unit 530, or a processor that receives and processes information from each different component of tracking unit 530. In one embodiment, movement calculator 538 is included within a general or host processor of a hardware platform for aerial robot 500. In one embodiment, movement calculator 538 includes one or more mechanisms to perform predictive calculations to estimate the location aerial robot 500 should move to. Some forms of tracking hardware will result in a delay between the movement of the target and the tracking or following movement of the aerial robot. By predicting the movement of the target, aerial robot 500 can compensate for the delay introduced by the tracking hardware.

Aerial robot 500 can include communication unit 540 to enable communication with a beacon, and/or a user controller, an override system, or other device that can provide information useful in computing the flight path. Communication unit 540 can enable aerial robot 500 to receive information to process to determine a location to move. Communication unit 540 can enable aerial robot 500 to receive coordinates identifying a location to move. Communication unit 540 can also be used to receive override data, initialization data, and to set a three dimensional offset. In one embodiment, communication unit 540 can include RF (radio frequency) transceiver 542 to enable the aerial robot to send and receive RF messages from the beacon.

In one embodiment, communication unit 540 receives data to enable compensation for delay. For example, aerial robot 500 can compensate for delay by receiving instantaneous velocity information from the target (beacon) and using that information to calculate its flight path. Aerial robot 500 can adjust the calculations based on subsequently received position information from its own position unit 520 and/or from position information for the target. For example, a target beacon can send position information and velocity information to aerial robot 500. Based on the velocity information, the aerial robot can compute a flight path, and move toward where it should be to maintain the digital tether, based on the calculations. When the beacon sends updated position and velocity information, tracking unit 530, via movement calculator 538, can compute an adjustment based on the actual position information, and compute flight path information based on both the new velocity information, and a comparison between the previous calculations and the new (actual) position information of the target.

In one embodiment, tracking unit 530 computes flight path information based on comparisons of subsequently-received position information. Such information can include signals received from the beacon itself in an embodiment where the target sends position information. In an embodiment where aerial robot 500 tracks the target without information sent by the target (e.g., video tracking), the received position information is information retrieved from tracking sensors in tracking unit 530. In one embodiment, tracking is based in part on sensors in the aerial robot (e.g., visual lock, heat seeking, other sensors) and partly on sensors in a beacon (e.g., GPS, IMU, barometer, or other units). In such an embodiment, processing of the movement and flight path calculations can be distributed between the aerial robot and the beacon.

It will be understood that tracking unit 530 can measure and compute calculations related to every aspect of a digital tether or relative offset of aerial robot 500 with respect to a target. Thus, X and Y coordinates with respect to the target, altitude from the target, and angle of offset with respect to the target can be monitored and computed. In one embodiment, each of the four position components (X, Y, and Z coordinates, as well as angle with respect to the target) is computed separately. Tracking unit 530 can compute each component separately and send composite data to FMU 510. In one embodiment, tracking unit 530 can dynamically modify one or more of the four components in flight, for example, in response to obstacle detection or reception of an override or reception of a modification to the digital tether.

In one embodiment, aerial robot 500 includes obstacle detection unit 550, which enables the aerial robot to detect and avoid obstacles. In one embodiment, obstacle detection unit 550 includes or leverages similar or the same type of sensors in use in tracking unit 530. In one embodiment, obstacle detection unit 550 provides data to be computed by movement calculator 538. In one embodiment, obstacle detection unit 550 includes a separate processing unit to compute movement information to provide to FMU 510. In the case that obstacle detection unit 550 operates separately from tracking unit 530, FMU can be programmed to recognize data from obstacle detection unit as higher priority than data from tracking unit 530. Thus, data from obstacle detection unit 550 can override and/or take precedence over data from tracking unit 530. Proximity detection units are becoming more prevalent, and can be used with obstacle detection unit 550 to identify obstacles.

In one embodiment, aerial robot 500 includes image capture unit 560, which can include a camera or other image capture device. The camera can produce still images and/or video. In one embodiment, image capture unit 560 includes a memory system (not explicitly shown) to store captured images/video. In one embodiment, image capture unit 560 transfers image capture data to be transmitted from aerial robot 500 to another device. In one embodiment, the camera is fixed on aerial robot 500, and is moved or pointed solely by movement of aerial robot 500. In one embodiment, image capture unit 560 includes control unit 562, which includes controls to move one or more aspects of the camera.

In one embodiment, pointing the camera at the target is a function of tracking unit 530. For example, during following or tracking, tracking unit 530 can keep the aerial robot and its camera pointed at the target via its flight. In one embodiment, control unit 562 can enable some movement of the camera that is in addition to movement by the aerial robot. Such movement can be considered independent of the movement of the aerial robot, at least from the perspective that the camera is not fixed and pointed solely by movement of the aerial robot. It will be understood that for a camera mounted on aerial robot 500, the motion of the aerial robot will always affect the motion of the camera to some extent, and thus it could be considered to not ever really be independent of the motion of the aerial robot.

However, control unit 562 can control a tilt axis and/or a rotational access for the camera. Thus, even if the target turns faster or accelerates, decelerates, ascends, or descends faster than the ability of aerial robot 500 can follow, the camera can still remain pointed at the target to record the target's action. In one embodiment, the entire body of aerial robot can yaw to face the target, since vertical-takeoff aircraft can fly in any direction, not only the direction they are pointed. In one embodiment, control unit 562 includes a roll axis to prevent tilting of the camera image or control the pitch of the camera during sideways robot acceleration.

As was explained above, there may be reasons aerial robot 500 may not perfectly track the motion of the target (e.g., acceleration in excess of what the aerial robot can track, offsets in the positioning equipment). Despite such imperfection in the motion tracking, aerial robot 500 can be considered to maintain its digital tether or its relative offset when the drifting is within expected tolerances. Despite drifting in the relative offset, it is possible to maintain a camera pointed at the target more precisely than the aerial robot might be able to track the target. As long as the camera is still pointed exactly at the target (and especially if the camera has an adjustable zoom lens), high quality image capture of the target is still possible. In one embodiment, image capture unit 560 includes automatic zoom control to control zoom to compensate for discrepancy between the desired position offset position and the actual position of the aerial robot. In one example, image capture unit 560 can include autofocus technology coupled to zoom control to maintain image focus despite variations in distance to the target by the aerial robot.

It is possible that tracking drift can affect image capture. To the extent such drift may occur, aerial robot 500 can be programmed to correct for such drift. In one embodiment, aerial robot 500 can use infrared or other light source on the target or on a beacon of the target that can be detected by the camera of image capture unit 560. The detection could also be performed by a secondary camera or detector specifically sensitive to infrared or a specific light wavelength or color, such as a sensor in tracking unit 530. A processor or computer of the aerial platform can average the position of the light source over time, and gradually apply compensation offsets to the commanded camera pointing angles. Such averaging of the position would tend towards the center of view of the camera. Intensity information could also be used to compensate for distance drift.

In one embodiment, communication unit 540 receives control signals from a user or administrator separate from the target (or a beacon of the target). For example, aerial robot 500 can be programmed to track the movement of the target autonomously while a user focuses only on camera position, angle, and zoom. In one embodiment, controls from a camera controller to move the angle of the shot can be interpreted and processed by aerial robot 500 into commands to change the offset of the aerial robot with the target. Thus, a user does not need to do anything specific with respect to flying or driving the aerial robot, but can simply monitor and manage camera equipment. Movements involving zoom and some angle adjustments can be implemented with the aerial robot maintaining its same digital tether. The aerial robot can process other camera angle adjustments as indications that the camera controller would like to change the offsets with respect to the target for a different shot, but can be received and interpreted from camera control signals, rather than explicit flying control signals.

Figure 6:
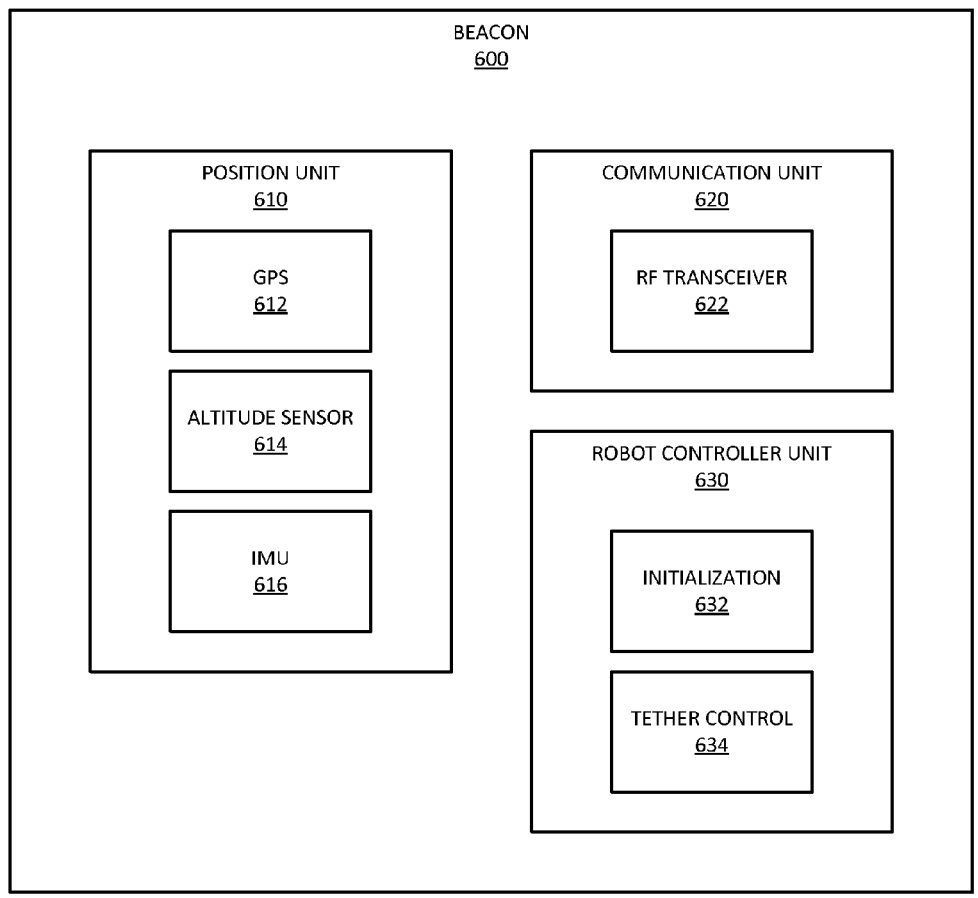
FIG. 6 is a block diagram of an embodiment of beacon including one or more features for enabling an aerial robot to track a target.

FIG. 6 is a block diagram of an embodiment of a beacon including one or more features for enabling an aerial robot to track a target. Beacon 600 can be one example of beacon in accordance with any embodiment described herein. Beacon 600 can include one or more of the following features, and does not necessarily include all features indicated in every embodiment. Different embodiments of beacon 600 can include different combinations of features. There may be other features that beacon 600 includes which are not explicitly described below. Different embodiments of beacon 600 can be trackable by the same aerial robot.

Beacon 600 includes position unit 610 to determine the three dimensional position of the target. Position unit 610 can be implemented as one or more processing devices and sensor devices or circuits. Position unit 610 can include one or more GPS units 612, altitude sensors 614, and/or IMUs 616. In one embodiment, beacon 600 includes multiple GPS units 612 to provide higher accuracy in its position determinations. In one embodiment, altitude sensor 614 can be or include one or more of a sonar unit, laser altitude guidance, barometer, or other sensor. Altitude sensor 614 can also be GPS unit 612. IMU 616 can utilize or include one or more accelerometers, magnetometers, and/or gyroscopes, such as 3-axis devices. In one embodiment, IMU includes a compass declination lookup table for all locations on Earth, and includes a magnetometer to track orientation over time. Gyroscopic data can be integrated to compute instantaneous orientation data. Orientation and accelerometer data can be integrated to compute velocity, which can be integrated to compute position. Such a resulting position is relative, but can be used to estimate absolute position by integrating over a time period corresponding to a specific lag in GPS data, then adding the relative position to the absolute position from GPS 612 to get an estimate of the absolute position at the current instant. In one embodiment, position unit 610 can include an ultrasound beacon signal generator (which can be part of communication unit 620 and/or another component not specifically shown), which beacon 600 can use to measure distance via propagation delay measurements with the aerial robot and/or through signal strength measurement.

In one embodiment, communication unit 620 provides data to a tracking aerial robot. Communication unit 620 can transmit one or more commands to the aerial tracking robot. Communication unit 620 can transmit position and/or velocity information for the target, which can be received and processed at a corresponding communication unit of the tracking aerial robot (e.g., communication unit 540). In one embodiment, communication unit 620 can include RF (radio frequency) transceiver 622 to enable the target to send and receive RF messages from the aerial robot.

In one embodiment, beacon 600 includes aerial robot controller unit 630 to provide commands or controls to the aerial robot via communication unit 620. Such controls can include initialization controls, stop controls, and/or controls that change an offset of the digital tether (e.g., perspective, position, angle). Thus, initialization control 632 can enable beacon 600 to operate to set a digital tether to a tracking aerial robot. Tether control 634 can enable beacon 600 to compute and send data related to a following or tracking procedure executed by the tracking aerial robot to maintain a relative three dimensional offset with respect to beacon 600. Information from robot controller unit 630 can enable the aerial tracking robot to maintain a camera pointed at the target.

FIGS. 7-10 provide pseudocode represents of certain operations. It will be understood that all instances of pseudocode provided here are to be understood generally. The processes called out can be programmed in any language. The pseudocode could be implemented as a state machine or hard-coded logic machine, or could be executed by a microprocessor or microcontroller. It will be understood that a beacon can have a hardware platform including hardware to execute the operations described in the pseudocode. An aerial device can have an aerial platform including hardware to execute the operations described in the pseudocode. Either platform will include storage resources for code and processing resources to execute the code.

FIG. 7 is a representation of an embodiment of pseudocode for a beacon to provide tracking information to an aerial robot. Code 700 provides example pseudocode for one example implementation that uses a GPS at both a beacon and an aerial robot. Code 700 deals with the beacon providing GPS data for the aerial robot to track the target.

Code 700 can execute as a continual monitoring loop while the aerial robot is set to track the target, line 702. The beacon reads its own GPS data, line 704. In one embodiment, if the GPS reading indicates that the beacon has changed position, line 706, code 700 can enter a subroutine. It will be understood that the code can have thresholds configured for detection of new GPS data. Thus, if the GPS readings indicate a change that is under a threshold, the code could ignore the change (new GPS data=FALSE).

In the subroutine, code 700 can update the stored location of the beacon to be the new GPS data read, line 708. When the target beacon moves, in one embodiment, the beacon can compute a new location for the aerial robot based on the new beacon location. For example, the beacon can compute a desired position for the aerial robot by adding stored three dimensional offsets to the new beacon location, line 710. The three dimensional offsets can be offsets recorded as an original digital tether. After computing coordinates for the desired aerial robot position, the beacon can send a radio command to the aerial robot. An example command can be a command to move the aerial robot to the computed desired position, line 714. Code 700 actually illustrates another command sent prior to the command to move to the desired position. In one embodiment, code 700 sends a command for the aerial robot to keep its camera pointed to the determined location of the beacon, line 712. By sending the command to keep the camera pointed at the target prior to the command to move the aerial robot, it allows the aerial robot to factor the camera positioning and angle into the movements of the aerial robot to reach the desired position. Without such a command, it is possible that the aerial robot movement could negatively affect the focus of the camera on the target. At line 716 the movement subroutine ends. At line 718 the monitoring loop ends.

FIG. 8 is a representation of an embodiment of pseudocode for aerial robot to track a target via a beacon. Code 800 provides example pseudocode for one example implementation that uses a GPS at both a beacon and an aerial robot. Code 800 deals with the aerial robot tracking the target based on GPS data received from the beacon.

Code 800 can execute as a continual monitoring loop while the aerial robot is set to track the target, line 802. The aerial robot reads its own GPS data, line 804. In one embodiment, if the GPS reading indicates that the aerial robot has changed position, line 806, the aerial robot will update its position information, line 808. The aerial robot stores position information to use in determining its location with respect to a tracked target. In line 810, the operations with respect to new GPS data for the aerial robot end.

In one embodiment, the aerial robot reads data received from its radio, line 812. More specifically, the aerial robot can read the data to determine if there are commands the aerial robot should execute. The reading of the GPS data for the aerial robot (lines 804, 806, 808, 810) can allow the aerial robot to determine how to process a command received from the beacon. For example, the aerial robot will need to know its current position to determine how to move to a different position.

If the radio data includes a command to keep the camera pointed to a particular location, line 814, the aerial robot can compute what operations or commands will be needed to cause the camera to be pointed to a received location, 816. The camera pointing subroutine ends at line 818. If the radio data includes a command to move the aerial robot, line 820, the aerial robot can compute navigational information to move to a received position, 822. More particularly, the aerial robot can compute a flight path. The robot movement subroutine ends at line 824.

The aerial robot can point the camera to location computed in the camera pointing subroutine, 826. The aerial robot can also update any navigational PID loops in place in the system, 828. Updating the PID loops can cause the aerial robot to send commands from the aerial platform to cause the flight hardware to move the aerial robot. The monitoring loop ends at line 830.

FIG. 9 is a representation of an embodiment of pseudocode for a beacon to establish a digital tether with an aerial robot. Code 900 provides example pseudocode for one example implementation that uses a GPS at both a beacon and an aerial robot. Code 900 deals with setting three dimensional offsets between the beacon and the aerial robot based on GPS data at the beacon.

Code 900 can be configured to determine if the aerial robot is in fixed hover mode, and is thus "stationary." For purposes of setting the digital offsets, it will be understood that stationary means maintaining a three dimensional position within acceptable tolerances. While not specifically shown, in one embodiment, the beacon sends a command to the aerial robot via a radio link to cause the aerial robot to enter a fixed hover mode. While the aerial robot is in the fixed hover mode, the beacon can loop to set offset values between a position of the beacon and the aerial robot, line 902.

In the loop, the beacon can read GPS data from its GPS module, line 904. If there is new GPS data, or when the GPS module returns its readings, line 906, the beacon updates its location data based on the GPS data, line 908. The GPS reading subroutine ends at line 910. In one embodiment, the beacon device is part of a user controller device. The controller device can include user controls (e.g., joystick controls) to allow the user to operate the aerial robot. The beacon can check to see if user controls have been adjusted, line 912. The controls can allow a user to control angle, height, and horizontal distances.

If the user controls have been adjusted, the beacon sets the desired position of the aerial robot to the position determined by the adjustment to the user controls, line 914. The beacon can then send a radio command to the aerial robot to hover at the desired position indicated by the adjustment, line 916. The user controls subroutine ends at line 918.

In one embodiment, the beacon can receive radio data from the aerial robot as well as sending commands and data to the aerial robot. Thus, the beacon can read radio data to determine if the aerial robot has sent information to the beacon, line 920. If the radio data includes telemetry information indicating a position of the aerial robot, line 922, the beacon can determine the three dimensional offsets of the digital tether by computing the aerial robot position minus the position of the beacon, line 924. The subroutine to compute the offsets ends at line 926. It will be understood that other sensors could be read and other sensor data used to compute positions and offsets in addition to the GPS data shown.

The offset setting routine ends at line 928. The beacon can save the offsets for use in later computations, line 930. For example, the offsets can be used by the beacon to send coordinate information to the aerial robot to provide position information for the aerial robot to follow the target. The beacon can then enter a following mode, and command the aerial robot to enter following mode as well, line 932. The aerial robot will maintain approximately the same offsets for the entire time following the target.

FIG. 10 is a representation of an embodiment of pseudocode for aerial robot to establish a digital tether with a beacon. Code 1000 provides example pseudocode for one example implementation that uses a GPS at both a beacon and an aerial robot. Code 1000 deals with setting three dimensional offsets between the beacon and the aerial robot based on GPS data at the beacon. Code 1000 can be configured to receive a command and enter a stationary or static hover for setting offsets. Such operations are not specifically called out in code 1000.

The aerial robot can execute code 1000 in response to a command to set offsets for a digital tether. The aerial robot can enter a code loop to set offset values between a position of the beacon and the aerial robot, line 1002. The aerial robot reads its GPS data to determine its current location, line 1004. When the GPS module reports the position settings, line 1006, the aerial robot can update its location by storing new values indicating its three dimensional position, line 1008. The subroutine for reading the position of the aerial robot ends at line 1010.

The aerial robot can check its radio communication components to read radio data received from the beacon, line 1012. The data can be, for example, commands generated in response to a user navigating the aerial robot to a specific location with respect to the beacon. If the radio data includes a command to hover, line 1014, the aerial robot sets a target hover position at a position received in the radio data, line 1016. The subroutine for setting the hover position ends at line 1018. The aerial robot can update PID loops that will navigate the aerial robot to the desired hover position, line 1020. The PID loops can control the aerial robot flight hardware to move the aerial robot. The aerial robot can then send telemetry information back to the beacon to indicate the hover position of the aerial robot, line 1022. In one embodiment, the aerial robot can re-check it GPS positioning to ensure that it is hovering at the desired position. The beacon can use the telemetry information to set three dimensional offsets. The hovering loop ends at line 1024.

Figure 11A:
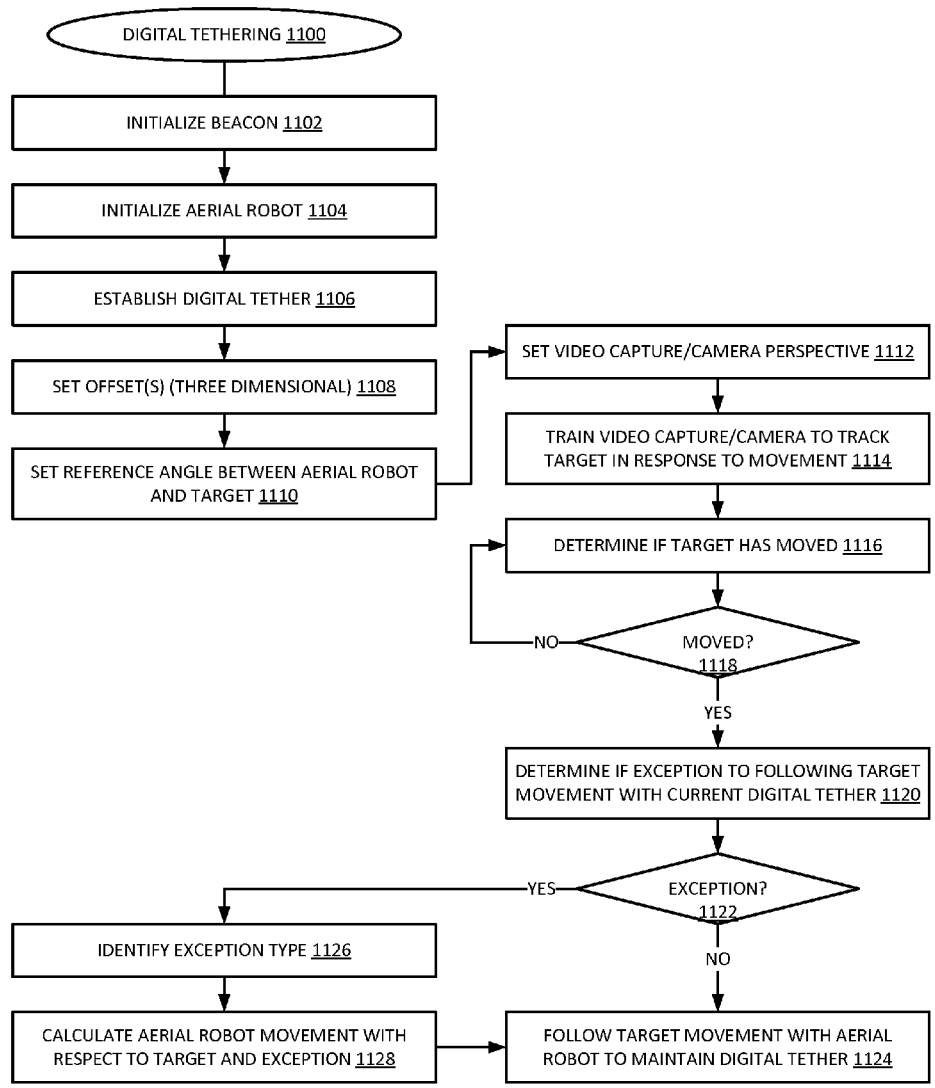
FIG. 11A is a flow diagram of an embodiment of a process for digital tethering.

FIG. 11A is a flow diagram of an embodiment of a process for digital tethering. In one embodiment, a beacon and an aerial robot coordinate operations to establish and maintain a digital tether, or set and maintain a relative three dimensional offset between the aerial robot and the target, 1100. It will be understood that process 1100 more specifically addresses a system configuration in which a beacon is used with the target. As described above, such a configuration is not the same for every embodiment, and other configurations are described above.

In one embodiment, the beacon is initialized, 1102. For example, a user can turn on the beacon and initiate its operation. The aerial robot is also initialized, 1104. The initialization of the aerial robot can include starting the robot flying, and resetting the aerial robot from any previous tracking or following mode. The beacon and aerial robot can establish a digital tether by exchanging information about the current positions of the beacon and the aerial robot, 1106. In one embodiment, the beacon receives all position information and computes the digital tether. In another embodiment, the aerial robot performs at least some of the computations involved in setting the digital tether. After determining the offsets of the digital tether, the beacon and/or the aerial robot can set offsets within their systems, 1108. The offsets provide values to compute a desired position for the aerial robot to maintain the same relative offset from the target.

It will be understood that the aerial robot and the beacon represent a system, which can perform computations to determine a position of the aerial robot with respect to the target. The aerial robot and/or the beacon can perform computations. In one embodiment, the system sets a reference angle between the aerial robot and the target, 1110. The reference angle can be set relative to the two devices (e.g., based on sensor readings) and/or set with reference to absolute angles.

The absolute angle refers to coordinates with reference to compass positions. In one embodiment, the system sets a perspective for video capture or other image capture, 1112.

The aerial robot can train the video capture or other image capture or camera to track the target in response to movement by the target, 1114. The video capture can also be moved in response to movement by the aerial robot. The video capture perspective can be independent (e.g., a separately controllable swivel mount) of movement of the robot. Training the video or image capture can include determining focus and how to image the target from the aerial robot.

When in a following or tracking mode, the system will perform operations to cause the aerial robot to track the target. The system can determine if the target has moved, 1116. In one embodiment, the aerial robot monitors the target and determines if it has moved. In one embodiment, the target determines if it has moved and sends commands to move the aerial robot with it. In one embodiment, a combination of operations by the aerial robot and target determine if the target has moved and direct the aerial robot to track the target. If the target has not moved, 1118 NO branch, the system can keep monitoring for motion.

If the target has moved, 1118 YES branch, the system can determine if an exception exists to the aerial robot following the target movement with the current digital tether or stored offsets, 1120. Exceptions can include obstacle avoidance, errors, or overrides. If there is no exception, 1122 NO branch, the system causes the aerial robot to follow the target movement to maintain the same relative three dimensional offset, 1124. If there is an exception to following with the current offsets, 1122 YES branch, the system can identify the type of exception, 1126, and calculate aerial robot movement or action with respect to the target based on the exception, 1128. Examples of exceptions are described below with respect to FIGS. 11B, 11C, and 11D.

Figure 11B:
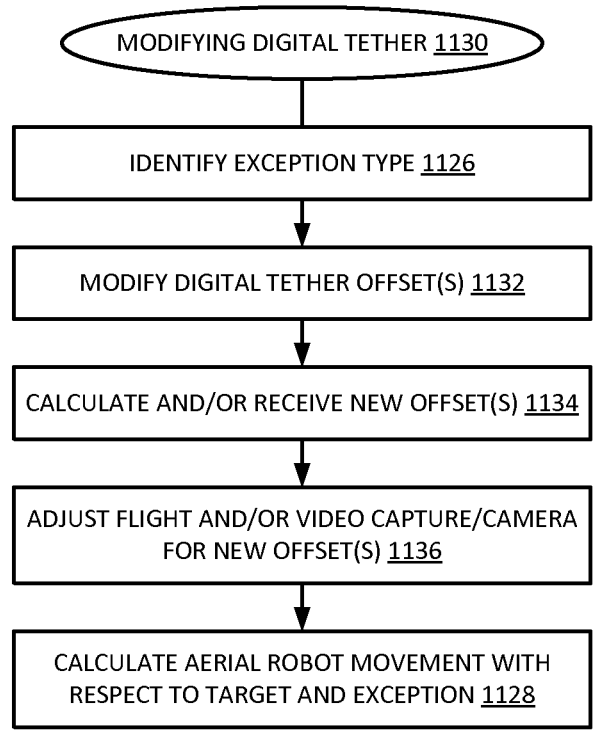
FIG. 11B is a flow diagram of an embodiment of a process for modifying a digital tether.

FIG. 11B is a flow diagram of an embodiment of a process for modifying a digital tether. In one embodiment, the target tracking dynamically changes in flight at least one aspect of the relative three dimensional position of the aerial robot with respect to the target. Process 1130 describes one embodiment of modifying the digital tether or relative offset. The system can identify the exception type as being modifying the digital tether, 1126 (from FIG. 11A). Thus, the system can modify the offsets used for the digital tether, 1132. It will be understood that the system can modify the digital tether while the aerial robot is tracking the target, and is thus different from establishing the digital tether, which would typically occur while the target and aerial robot are stationary.

In one embodiment, modification of the relative position or set fixed offset between the aerial robot and the target can be initiated for one of a variety of reasons. For example, the aerial robot can detect a collision or obstacle and attempt to modify its offset with respect to the target to maneuver around the obstacle. The beacon or another controller source can initiate the modification, for example, to change how the target is being recorded by the aerial robot's image capture unit. The system computes one or more new offsets for the aerial robot. Either the aerial robot can calculate the new offset(s), or the beacon can calculate the new offset(s) and send them to the aerial robot, 1134.

The aerial robot adjusts its flight path and/or video capture for the new offset(s), 1136. In one embodiment, the aerial robot attempts to maintain the same camera perspective on the target even while changing its flight path. In one embodiment, the aerial robot changes camera perspective along with changing flight path. The system can then calculate the aerial robot movement consistent with the modified offset(s), 1128 (from FIG. 11A).

In one embodiment, an aerial robot has a fixed path or a preset path that it will fly. Thus, the aerial robot can be programmed for a specific path and the "target" would be the ground or course the aerial robot would track along the preset flight path. For example, consider a specific path for a downhill snowboarding or skiing event. The path can be the same for the aerial robot to capture video for each participant of the event, but each participant will reach a particular point in the path at different times. Thus, in one embodiment, distance offsets are maintained along the preset flight path, but acceleration and/or velocity along the path can be altered dynamically. Thus, the aerial robot would not need to compute the flight path, but only the acceleration along the flight path, or velocity from one point to another point in the flight path. Such a configuration would allow much simpler flight controls for a user, and could be performed by the camera controller (thus, only a single individual would be needed to control the flight and image capture, as opposed to traditional systems that would require two). Thus, while most examples are provided herein in terms of a three dimensional offset, velocity and/or acceleration and/or angle with respect to the target could be considered one or more additional dimensions. Thus, as stated above, the aerial robot can track in multiple dimensions, three distance dimensions as well as other dimensions.

Figure 11C:
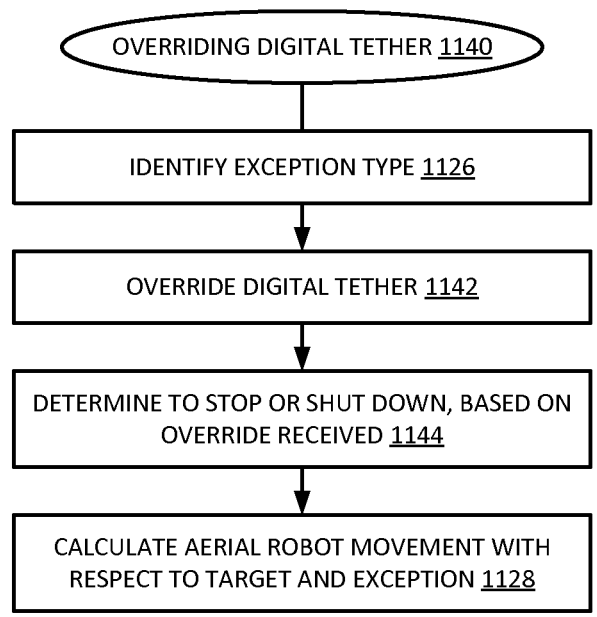
FIG. 11C is a flow diagram of an embodiment of a process for overriding a digital tether.

FIG. 11C is a flow diagram of an embodiment of a process for overriding a digital tether. Process 1140 describes one embodiment of overriding the digital tether or relative offset. The system can identify the exception type as being overriding the digital tether, 1126 (from FIG. 11A). Thus, the system can override the following or tracking of the aerial robot, 1142. An override condition can be internal to the aerial robot based on detection of an error condition, loss of one or more systems, or some other condition. An override can be external to the robot such as a "kill switch" by the beacon or other user. If an override is received, the aerial robot can perform a stop or shutdown or other operation based on the type of override received, 1144. The system can then calculate the aerial robot movement consistent with the modified offset(s), 1128 (from FIG. 11A). In an override condition, the movement will typically be either to enter a static hover and/or to automatically land.

Figure 11D:
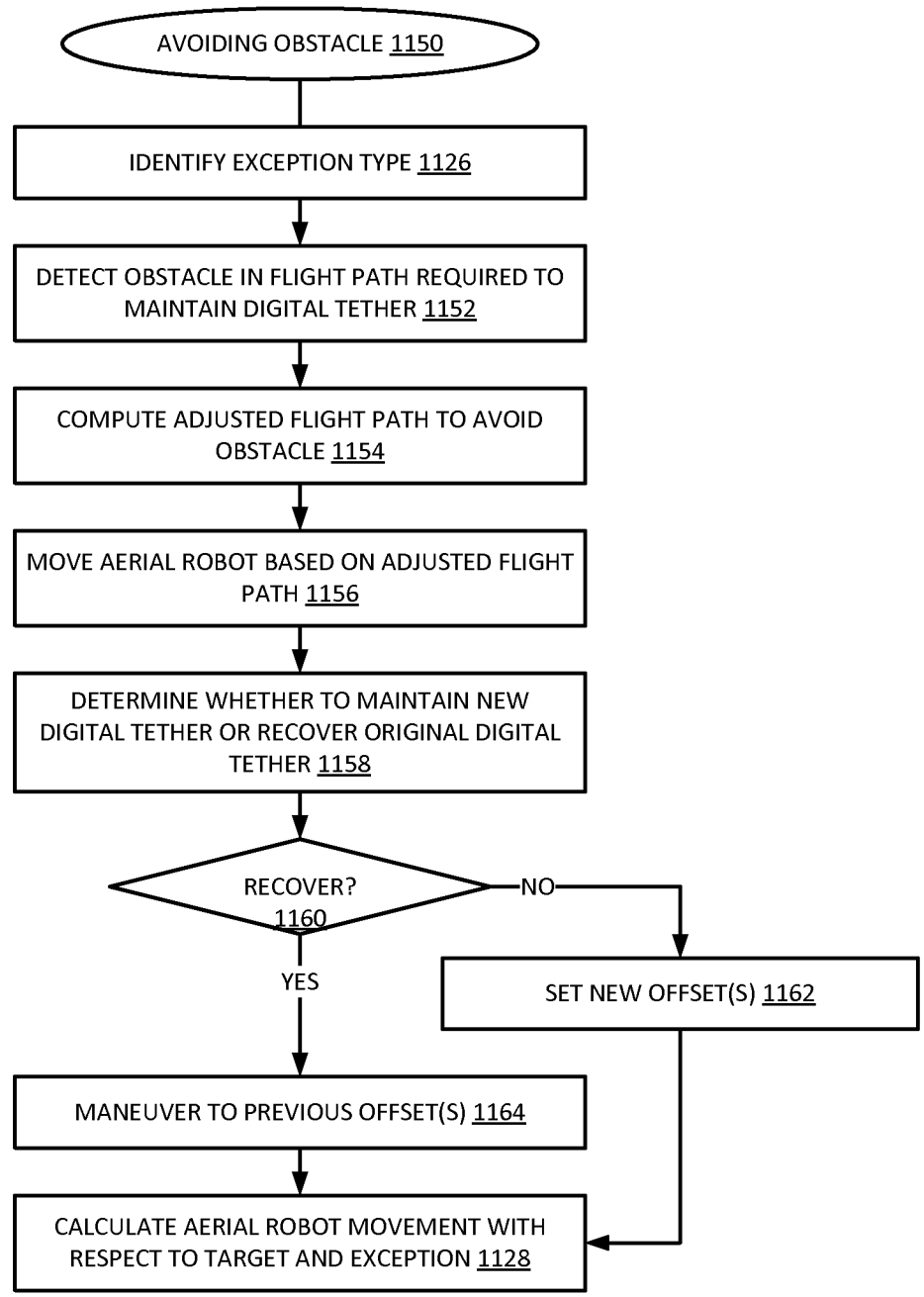
FIG. 11D is a flow diagram of an embodiment of a process for avoiding an obstacle while being digitally tethered to a moving target.

FIG. 11D is a flow diagram of an embodiment of a process for avoiding an obstacle while being digitally tethered to a moving target. Process 1150 describes one embodiment of overriding the digital tether or relative offset for obstacle avoidance. The system can identify the exception type as being avoiding an obstacle, 1126 (from FIG. 11A). The aerial robot can include one or more sensors to detect an obstacle in its flight path, 1152, or that the flight path will cross through the location of the obstacle. The flight path is the path required by the aerial robot to maintain the digital tether. When the obstacle is in the flight path, the aerial robot is unable to maintain the digital tether. Thus, the system can compute an adjusted flight path to avoid the obstacle, 1154. In one embodiment, the aerial robot can temporarily hover while the system computes an updated position or flight path.

After computing a new position or flight path, the aerial robot can move in a new flight path to avoid the obstacle, 1156. It will be understood that avoiding the obstacle could require several iterations of attempting new positions or flight paths to completely get around an obstacle. In one embodiment, the system can determine whether to maintain a new digital tether based on the new location of the aerial robot after avoiding the obstacle, or whether to recover the original digital tether after avoiding the obstacle, 1158. If the aerial robot is not to recover the original digital tether, 1160 NO branch, the system can determine new offsets based on the location or predicted location of the aerial robot, and then store those offsets as the digital tether offsets for the system, 1162.

If the aerial robot is to recover the original digital tether, 1160 YES branch, the system computes movement necessary by the aerial robot to maneuver to a position consistent with the original offsets, 1164. Depending on the distance needed to recover the original offsets, the aerial robot could be required to accelerate for a period of time. The programming of the aerial robot can limit the amount of acceleration. Thus, the system can calculate the aerial robot movement needed to recover the original digital tether or maintain the new digital tether, 1128 (from FIG. 11A).

In one aspect, a method in an aerial robot includes: setting a relative position (which could be a three dimensional or multi-dimensional position) of the aerial robot with respect to a target; and automatically adjusting a flight path of the aerial robot in response to movement of the target, to maintain substantially the same relative position of the aerial robot with respect to the target.

In one embodiment, setting the relative position of the aerial robot comprises: manually initializing the position of the aerial robot with respect to the target. In one embodiment, setting the relative position of the aerial robot further comprises: setting a distance of the aerial robot from the target; setting an altitude of the aerial robot above the target; and setting angle of the aerial robot relative to the target. In one embodiment, setting the relative position of the aerial robot further comprises: setting global positioning system (GPS) coordinates of the aerial robot with respect to GPS coordinates of the target. In one embodiment, automatically adjusting the flight path of the aerial robot comprises: moving a location of the aerial robot in response to a radio signal from the target indicating new coordinates of the target due to movement of the target.

In one embodiment, the method further includes: monitoring the target with an image capture device from the aerial robot. In one embodiment, monitoring the target with the image capture device comprises monitoring the target with a video capture device. In one embodiment, monitoring the target with the image capture device further comprises: moving the image capture device independently from adjusting the flight path of the aerial robot. In one embodiment, monitoring the target with the image capture device further comprises: setting one or more of a pitch or a yaw of the image capture device with respect to the target. In one embodiment, the method further includes: dynamically changing in flight at least one aspect of the relative position of the aerial robot with respect to the target.

In one embodiment, setting the relative position of the aerial robot further comprises: setting a relative angle offset of the aerial robot with respect to the target. In one embodiment, the method further includes: dynamically changing the relative angle offset of the aerial robot based on motion of the target to maintain a relative angle offset of the aerial robot with respect to the target. In one embodiment, the method further includes: determining that the target has changed direction more than a threshold within a time period; and automatically preventing dynamically changing the relative angle offset in response to determining that the target has changed direction more than the threshold within the time period.

In one aspect, an aerial robot includes: a position detection unit to determine a position (e.g., a three dimensional position) of the aerial robot; a flight management unit (FMU) to control a flight path of the aerial robot; a target tracking unit to identify a target, determine a relative position of the aerial robot with respect to the target based on the position detection unit, and compute motion calculations for the FMU to automatically adjust the flight path of the aerial robot in response to movement of the target, to maintain substantially the same relative position of the aerial robot with respect to the target.

In one aspect, an electronic device can be included in an aerial robot or other aerial device. The electronic device can include: a position detection unit to determine a position (e.g., a three dimensional position) of an aerial device; a flight management unit (FMU) to control a flight path of the aerial device; a target tracking unit to identify a target, determine a relative position of the aerial device with respect to the target based on the position detection unit, and compute motion calculations for the FMU to automatically adjust the flight path of the aerial device in response to movement of the target, to maintain substantially the same relative position of the aerial device with respect to the target.

In one embodiment, the target tracking unit is to set the relative three dimensional position of the aerial robot in response to a manual input by a user of the aerial robot. In one embodiment, the target tracking unit is further to set the relative three dimensional position of the aerial robot including setting a distance of the aerial robot from the target; setting an altitude of the aerial robot above the target; and setting angle of the aerial robot relative to the target. In one embodiment, the target tracking unit is to set the relative three dimensional position of the aerial robot further including setting global positioning system (GPS) coordinates of the aerial robot with respect to GPS coordinates of the target. In one embodiment, the target tracking unit is to adjust the flight path of the aerial robot including: receiving a radio signal from the target indicating new coordinates of the target; and moving a location of the aerial robot in response to receiving the radio signal.

In one embodiment, the aerial robot further includes an image capture device to monitor the target. In one embodiment, the image capture device comprises a video capture device. In one embodiment, the aerial robot further includes an image capture device control unit to monitor the target including moving the image capture device independently from adjustment of the flight path of the aerial robot. In one embodiment, the control unit is further to set one or more of a pitch or a yaw of the image capture device with respect to the target.

In one embodiment, the target tracking unit is further to dynamically change in flight at least one aspect of the relative three dimensional position of the aerial robot with respect to the target. In one embodiment, the target tracking unit is further to set the relative three dimensional position of the aerial robot including setting a relative angle offset of the aerial robot with respect to the target. In one embodiment, the target tracking unit is further to dynamically change the relative angle offset of the aerial robot based on motion of the target to maintain a relative angle offset of the aerial robot with respect to the target. In one embodiment, the target tracking unit is further to determine that the target has changed direction more than a threshold within a time period; and automatically prevent dynamically changing the relative angle offset in response to determining that the target has changed direction more than the threshold within the time period.

In one aspect, a method includes: determining a relative position (e.g., a three dimensional position) of an aerial device with respect to a target; receiving a communication at the aerial device from a transmitter of the target, the communication indicating a position of the target and velocity information for the target; automatically adjusting a flight path of the aerial device based on the velocity information for the target, to maintain substantially the same relative position of the aerial device with respect to the target.

In one embodiment, the velocity information comprises an instantaneous speed of the target. In one embodiment, the velocity information comprises an instantaneous direction of the target. In one embodiment, the velocity information comprises an average speed of the target. In one embodiment, the velocity information comprises an average direction of the target. In one embodiment, the position information further comprises altitude information.

In one aspect, a method includes: determining a relative position (e.g., a three dimensional position) of an aerial device with respect to a target; receiving a communication at the aerial device from a transmitter of the target, the communication indicating a position of the target; comparing the position of the target as indicated in the received communication to a last-known position of the target; calculating a motion vector of the target based on the comparing; and automatically adjusting a flight path of the aerial device based on the calculated motion vector, to maintain substantially the same relative position of the aerial device with respect to the target.

In one embodiment, the position of the target includes altitude information. In one embodiment, calculating the motion vector of the target based on the comparing further comprises: computing a new motion vector based on the last-known position and the position as indicated in the received communication; and performing a weighted averaging of a previous motion vector with the new motion vector.

In one aspect, a method in an aerial device includes: receiving obstacle indication data from a collision detection sensor of the aerial device; computing flight path calculations to adjust a position (e.g., a three dimensional position) of the aerial device to maintain substantially a fixed relative three dimensional offset of the aerial device with respect to a target; determining, based on the obstacle indication data, that the computed flight path calculations will cause the aerial device to cross an obstacle location; and in response to determining that the aerial device will cross the obstacle location, re-computing flight path calculations to adjust the relative position of the aerial device to avoid crossing the obstacle location without maintaining the substantially fixed relative offset with respect to the target.

In one embodiment, the method further includes: subsequent to avoiding the obstacle, adjusting the flight path of the aerial device to regain the substantially fixed relative three dimensional offset with respect to the target. In one embodiment, the method further includes: subsequent to avoiding the obstacle, dynamically changing the fixed relative three dimensional offset to a new fixed relative three dimensional offset; and automatically adjusting the flight path of the aerial device to substantially maintain the new fixed relative three dimensional offset with respect to the target.

In one aspect an article of manufacture includes a computer readable storage medium having content stored thereon, which when executed performs operations to execute a method in accordance with any embodiment of any method described above. In one aspect an apparatus includes means for performing operations to execute a method in accordance with any embodiment of any method described above.

As used herein, instantiation refers to creating an instance or a copy of a source object or source code. The source code can be a class, model, or template, and the instance is a copy that includes at least some overlap of a set of attributes, which can have different configuration or settings than the source. Additionally, modification of an instance can occur independent of modification of the source.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method in an aerial robot comprising:
   setting a relative position of the aerial robot with respect to a target;

determining a current position of the target;
determining a current position of the aerial robot;
generating a prediction of a future position of the aerial robot to maintain substantially the same relative position for the future position of the aerial robot with respect to a future position of the target, wherein the future position of the aerial robot and the future position of the target are based on the determined current positions and respective previous positions and further based on a target velocity vector based on inertial measurement information generated by an accelerometer or gyroscope at the target; and
automatically adjusting a flight path of the aerial robot in response to movement of the target based at least in part on the prediction of the future position of the aerial robot, to maintain substantially the same relative position of the aerial robot with respect to the target.

2. The method of claim 1, wherein setting the relative position of the aerial robot comprises:
manually initializing the position of the aerial robot with respect to the target.

3. The method of claim 1, wherein setting the relative position of the aerial robot further comprises:
setting a distance of the aerial robot from the target;
setting an altitude of the aerial robot above the target; and
setting an angle of the aerial robot relative to the target.

4. The method of claim 1, wherein setting the relative position of the aerial robot further comprises:
setting global positioning system (GPS) coordinates of the aerial robot with respect to GPS coordinates of the target.

5. The method of claim 1, wherein automatically adjusting the flight path of the aerial robot comprises:
moving a location of the aerial robot in response to a radio signal from the target indicating new coordinates of the target due to movement of the target.

6. The method of claim 1, further comprising:
monitoring the target with a video capture device from the aerial robot.

7. The method of claim 6, wherein monitoring the target with the video capture device further comprises:
moving the video capture device independently from adjusting the flight path of the aerial robot.

8. The method of claim 6, wherein monitoring the target with the video capture device further comprises:
setting one or more of a pitch or a yaw of the video capture device with respect to the target.

9. The method of claim 1, further comprising:
dynamically changing in flight at least one aspect of the relative position of the aerial robot with respect to the target to create an updated relative position; and
automatically adjusting the flight path of the aerial robot in response to movement of the target based at least in part on the prediction of the future position of the aerial robot, to maintain substantially the same updated relative position of the aerial robot with respect to the target.

10. The method of claim 1, wherein setting the relative position of the aerial robot further comprises:
setting a relative angle offset of the aerial robot with respect to the target.

11. The method of claim 1, wherein determining the current position of the target and determining the current position of the aerial robot are determined with commercial GPS equipment that introduces a time lag into position determination when the aerial robot and/or the target are moving, and wherein generating the prediction comprises generating a prediction of a sufficient length of time to correct the time lag.

12. An aerial robot comprising:
a position detection unit to determine a three dimensional position of the aerial robot;
a flight management unit (FMU) to control a flight path of the aerial robot;
a target tracking unit to identify a target, determine a current position of the target, determine a relative position of the aerial robot with respect to the target based on the position detection unit, and compute motion calculations for the FMU to automatically adjust the flight path of the aerial robot in response to movement of the target, to maintain substantially the same relative three dimensional position of the aerial robot with respect to the target, including generate a prediction of a future position of the aerial robot to maintain substantially the same relative position for the future position of the aerial robot with respect to a future position of the target, wherein the future position of the aerial robot and the future position of the target are based on the determined current positions and respective previous positions and further based on a target velocity vector based on inertial measurement information generated by an accelerometer or gyroscope at the target.

13. The aerial robot of claim 12, wherein the target tracking unit is further to set the relative three dimensional position of the aerial robot including
setting a distance of the aerial robot from the target;
setting an altitude of the aerial robot above the target; and
setting an angle of the aerial robot relative to the target.

14. The aerial robot of claim 12, wherein the target tracking unit is to set the relative three dimensional position of the aerial robot further including setting global positioning system (GPS) coordinates of the aerial robot with respect to GPS coordinates of the target.

15. The aerial robot of claim 12, wherein the target tracking unit is to adjust the flight path of the aerial robot including:
receiving a radio signal from the target indicating new coordinates of the target; and
moving a location of the aerial robot in response to receiving the radio signal.

16. The aerial robot of claim 12, further comprising an image capture device to monitor the target.

17. The aerial robot of claim 16, further comprising an image capture device control unit to monitor the target including moving the image capture device independently from adjustment of the flight path of the aerial robot.

18. The aerial robot of claim 12, wherein the target tracking unit is to further dynamically change in flight at least one aspect of the relative three dimensional position of the aerial robot with respect to the target.

19. The aerial robot of claim 12, wherein the target tracking unit is further to set the relative three dimensional position of the aerial robot including setting a relative angle offset of the aerial robot with respect to the target.

20. The aerial robot of claim 12, wherein the position detection unit is to determine the three dimensional position of the aerial robot with commercial GPS equipment that introduces a time lag into position determination when the aerial robot is moving, and wherein the target tracking unit is to generate the prediction having sufficient length of time to correct the time lag.

* * * * *